Oct. 20, 1936.                G. H. ALLEN                 2,057,871
                    TESTER FOR BREAKER MECHANISMS
                Filed Nov. 8, 1934          3 Sheets-Sheet 1

INVENTOR.
Gerald H. Allen
BY Chappell + Earl
ATTORNEYS.

INVENTOR.
Gerald H. Allen
BY Chappell & Earl
ATTORNEYS.

Oct. 20, 1936.            G. H. ALLEN            2,057,871
TESTER FOR BREAKER MECHANISMS
Filed Nov. 8, 1934            3 Sheets-Sheet 3

INVENTOR.
Gerald H. Allen
BY
Chappell & Earl
ATTORNEYS.

Patented Oct. 20, 1936

2,057,871

UNITED STATES PATENT OFFICE 2,057,871

TESTER FOR BREAKER MECHANISMS

Gerald H. Allen, Kalamazoo, Mich., assignor to Allen Electric & Equipment Company, Kalamazoo, Mich.

Application November 8, 1934, Serial No. 751,971

7 Claims. (Cl. 177—311)

The objects of this invention are:

First, to provide a machine for testing the breaker mechanism of ignition systems of internal combustion engines to check the angular spacing of the firing and to test the automatic advance and to determine the length of time the breaker points are closed to energize the spark coil.

Second, to provide such an apparatus for testing the breaker in which a rotating neon tube is made to produce sharp and defined lines at the point of breaking of the primary circuit of a spark coil.

Third, to produce such an apparatus in which a visible electric signal is given to determine the point of firing in which the signal may be either a neon tube or a spark.

Fourth, to provide such an apparatus suitable for testing the breaker mechanism of a distributor of the ignition system of an internal combustion engine in which two spark coils are employed for firing separate banks of cylinders either because the motor is of the V-type with the banks of cylinders set at odd angles or because the cylinders are so numerous that a single coil could not be energized sufficiently between firing of the cylinders.

Further objects and advantages pertaining to details and economies of construction and operation will appear from the description to follow. A preferred embodiment of my invention is illustrated in the accompanying drawings, in which.

Figure 1:
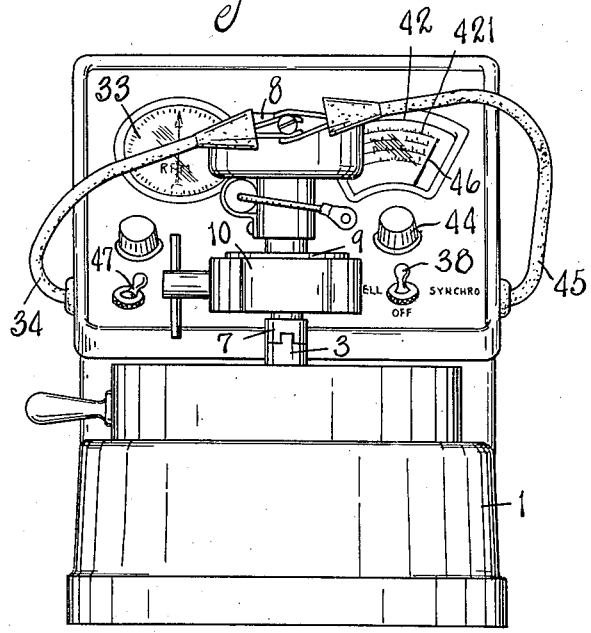
Fig. 1 is a front view of the apparatus embodying my invention.
Figure 3:
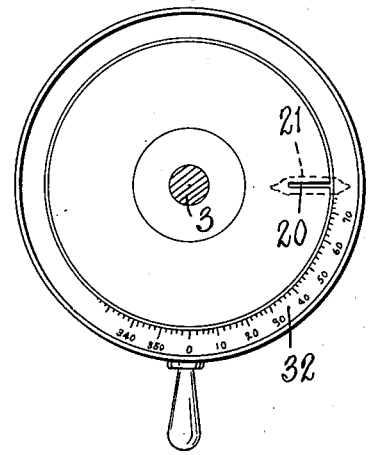
Fig. 3 is a plan view showing a protractor scale and rotating neon tube.
Figure 2:
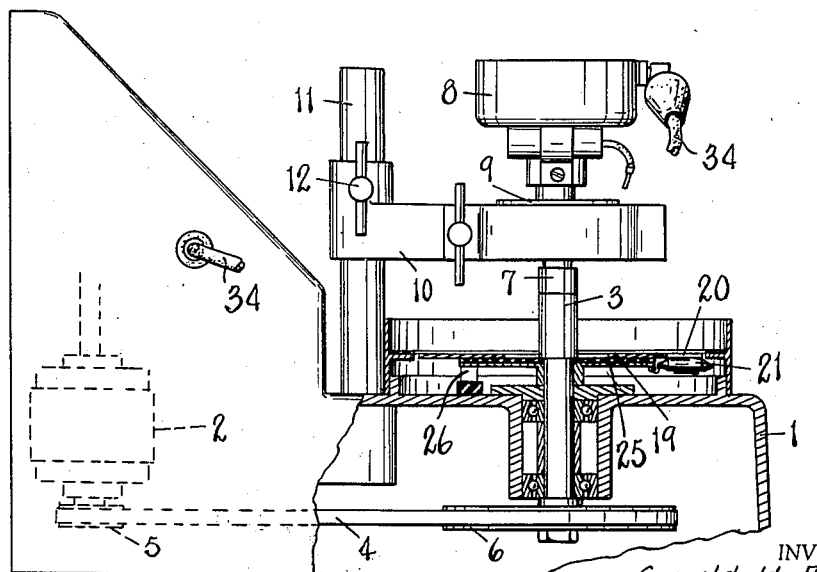
Fig. 2 is a side view partly in section.

In the drawings, 1 is a base in which is mounted a motor 2 connected to drive shaft 3 by means of belt 4 trained over pulleys 5 and 6. The shaft 3 is vertically mounted and, as in my copending application Serial No. 720,039, filed April 11, 1934, for Distributor testing apparatus, the shaft 3 is provided with a clutch 7 adapted to engage and drive the breaker mechanism to be tested. Breaker mechanism to be tested is shown as 8 and it is supported in a suitable bracket or screw clamp 9 mounted on arm 10 which is supported on upright post 11 by means of set screw 12. The breaker mechanism 8 is of the usual type consisting of a stationary contact 13, a movable contact 14, which is supported on the arm 15 pivoted at 16 to be actuated by the cam 17 which is here shown as a six-lobe cam, thus contacting the points 13 and 14 and breaking them six times for each revolution of the cam. The mechanism is grounded at 18.

On the shaft 3 is fixed a rotating disk 19 which is provided with a radial slit 20 beneath which is mounted a neon tube 21. This neon tube is of the flasher type and consists of a glass tube 22 having metal caps 23 at the ends thereof, so that the passage of a high tension current therethrough will cause the lamp to flash. The lamp is mounted beneath and in register with the slot 20 and is grounded as indicated at 24, the other end being connected to the collector ring 25 which contacts a brush 26 which is in turn connected by a wire 27 to the secondary 28 of a spark coil 29 which also has a primary 30.

Resistance 31 is connected in series circuit relationship with the neon tube and with the secondary 28 of the spark coil. This resistance is of substantially 100,000 ohms and is provided in the system to cause the flash of the neon tube to give a clear, thin line when the bulb 21 is lighted from the spark coil 29 while the bulb is being rotated. I have found that a resistance of substantially 100,000 ohms will dampen out the oscillations in the circuit to such an extent that the fading off of the discharge is not present and does not show as the tube is rotated during testing of the breaker mechanism. It will be appreciated that any resistance that appreciably dampens the oscillations in the circuit of the neon tube and the secondary 28 of the spark coil without cutting down appreciably the illumination or brightness of the tube will be satisfactory.

Adjacent the disk 19 is the protractor scale 32 laid out in degrees so that by consulting the scale when the device is in operation one can determine the angular spacing of the flashes of the neon tube. The motor may be of variable speed and a tachometer 33 may be employed to determine revolutions for testing the automatic advance on the breaker mechanism. The primary 30 of the spark coil 29 is connected by wire 34 to the breaker mechanism 8 and may be connected in series circuit relationship with a battery or other suitable source of electrical energy 35 by means of wires 36 and 37 and switch 38. The switch 38 consists of the switch arm 39 and the contacts 40 and 41. The circuit of the breaker mechanism, the primary of the coil 29 and the battery 35 is made by swinging the arm 39 against contact 40 to complete the circuit.

When the switch arm 39 is thrown against the contact 41, an ammeter 42, a fixed resistance 43, a variable resistance 44 are thrown into series circuit relationship with the breaker 8 through wire 45 and with the battery 35. This ammeter is of the usual type and is described in my copending application filed of even date, Serial No. 751,972. It is connected so that when the breaker points are closed and the switch 39 is thrown to contact the arm 41, the current from the battery will flow through the ammeter. By adjusting the variable resistance 44, the amount of current passing can be so arranged that the ammeter gives its full reading and, of course, gives a zero reading when the breaker points are open.

By operating the breaker mechanism, the points are opened and closed and the current from the battery passes through the ammeter a portion only of the time. The circuit outlined is non-inductive in its character so that on opening of the breaker points the current dies down immediately and on closing of the points the current immediately reaches full strength. It will thus be seen that the pointer 46 of the ammeter 42 will be positioned at a point intermediate the ends of the scale 43 thereon. The position taken will correspond to the length of time the points 13 and 14 of the breaker 8 are closed as the average amount of current passing through the ammeter will be measured.

A switch 47 is provided for setting the ammeter. This is of importance only to avoid the necessity for making sure that the points 13 and 14 are closed while adjusting the variable resistance to adjust the ammeter to make the test effective.

Figure 4:
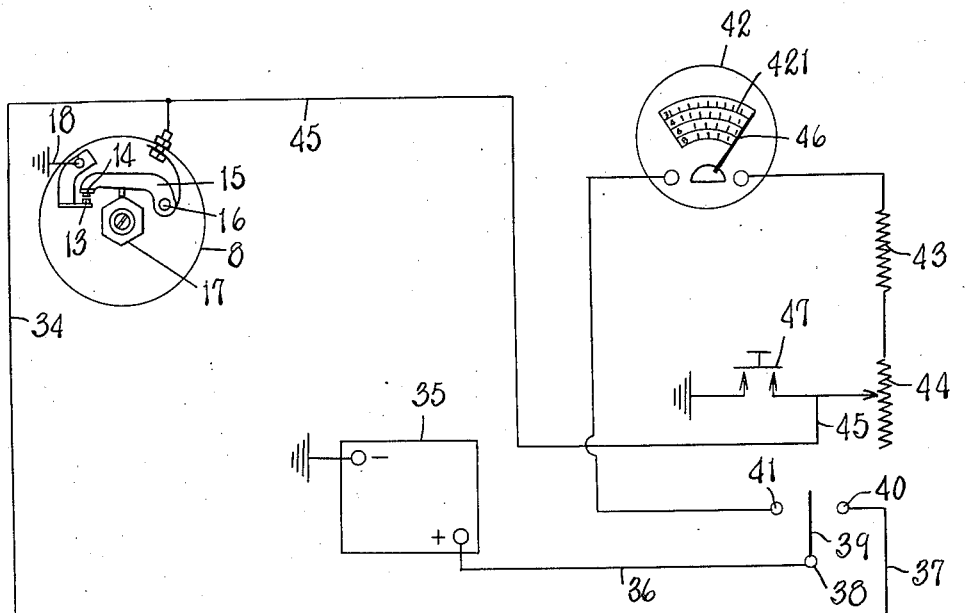
Fig. 4 is a diagrammatic view showing the circuit relationship of the various elements of my invention.
Figure 4:
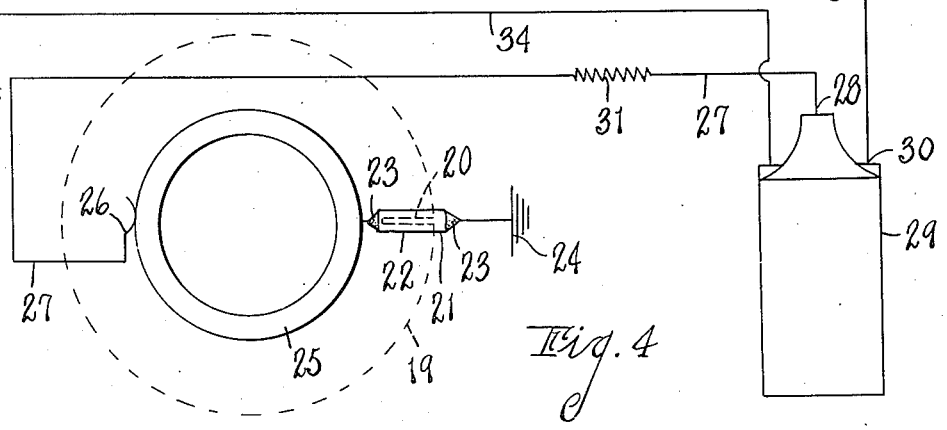
Figure 5:
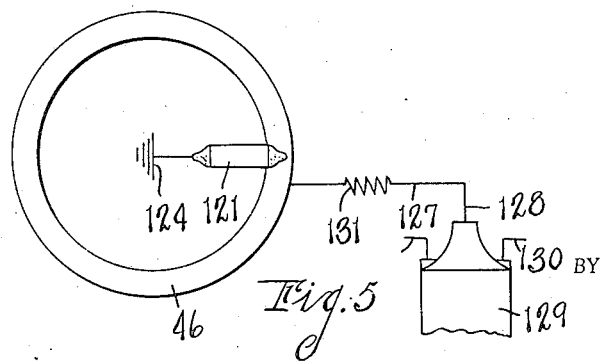
Fig. 5 is a diagrammatic view of the circuit of a modification of the structure shown in Figs. 1-4.
Figure 6:
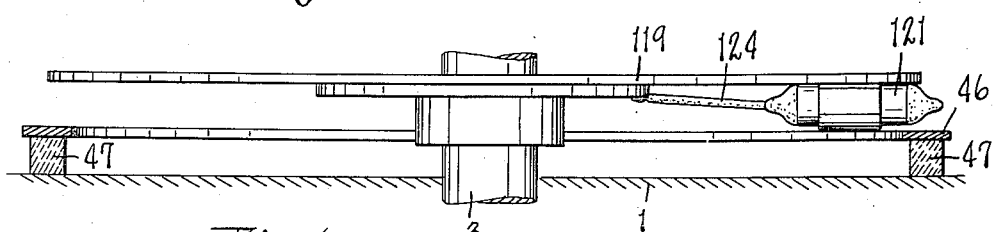
Fig. 6 is a detail view in section showing the rotating neon tube for use in the circuit shown in Fig. 5.

In the modification shown in Figs. 5 and 6, the neon tube is not connected directly to the secondary 128 of the spark coil 129. In Fig. 5 I have shown the changes in the circuit which is identical in other respects with that shown in Fig. 4. The wire 127 from the secondary 128 is connected to a fixed ring 46 of conductive material which is insulated by suitable insulation 47. The neon tube 121 is of a construction similar to the tube 21 and has one end grounded as at 124, the other end being positioned so that during rotation of the disk 119 its other end passes adjacent the ring 46 which is connected by the wire 127 to the secondary 128 of the spark coil 129. As the breaker mechanism operates on the primary 130 of the coil 129, the coil energizes the ring 46 which, by induction, creates a flashing in the tube 121.

A resistor 131, identical with the resistor 31, is placed in this circuit and dampens the oscillations so that the pattern given by the revolving tube 121 is that of clear and distinct lines indicating the points of breaking the circuit of the primary of the coil by the breaker.

If desired, instead of using a neon tube, the prior art construction of a revolving contact arm in a ring can be utilized with the secondary of the coil creating a spark from the ring to the arm as the arm is rotated. Utilizing a resistor such as 31 or 131 in this circuit likewise prevents oscillation and produces a spark which is not fuzzy and which is sharp and defined, giving a clear indication of the point of firing without fanning out of the spark as is the case when such apparatus is employed without my improved arrangement of a resistor to dampen oscillations in the circuit. I have found that using my arrangement of a resistor in series with the secondary of the spark coil by dampening oscillations in the circuit causes the tube or spark, whichever the case may be, to give a more clearly defined sharp line so that it is easier for one conducting a test to obtain accurate readings to show the angular spacing of the points of firing and to determine the operation of the automatic spark advance which is usually incorporated in the breaker mechanism and which is tested by using a variable speed drive for the breaker mechanism.

Figure 7:
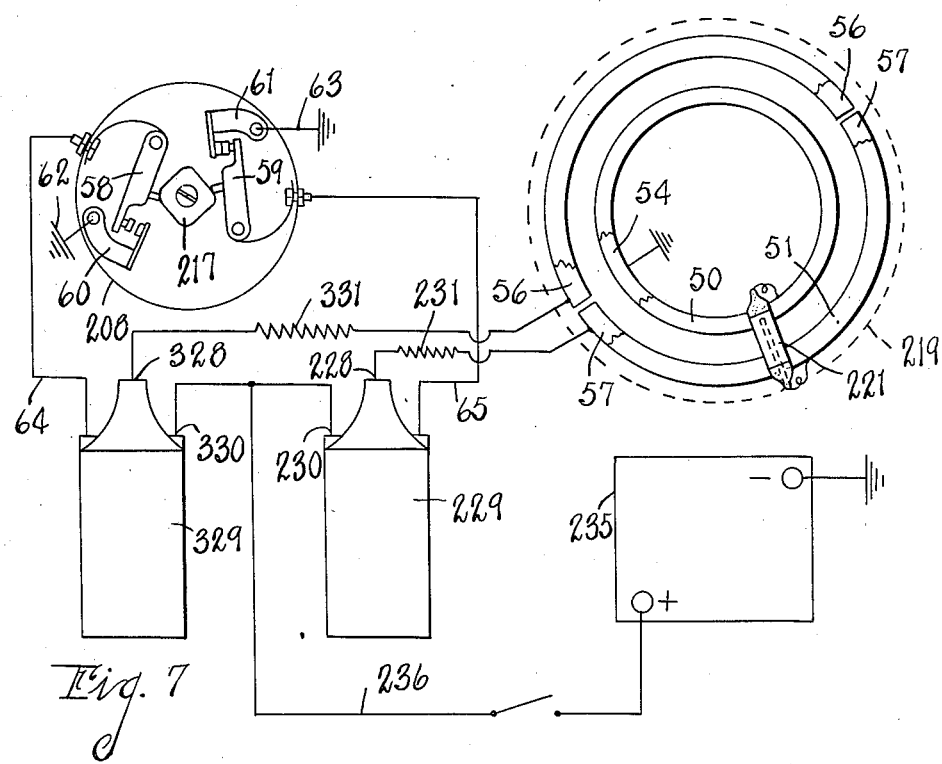
Fig. 7 is a diagrammatic view of the circuit of an apparatus for use in testing two-arm breaker mechanisms which are used in ignition systems employing two spark coils.
Figure 8:
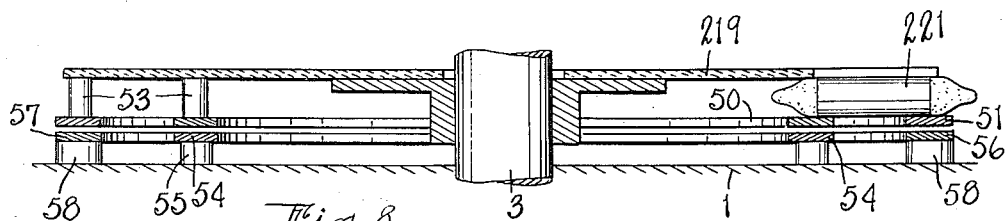
Fig. 8 is a detail view of the neon tube and the revolving mechanism for use in the circuit shown in Fig. 7.

In Figs. 7 and 8, I have shown a modification of my device for testing two-arm breakers of ignition systems using a pair of spark coils to fire different banks of cylinders. Such an ignition system is used either in V-type motors where the angle between the blocks is odd or in cars such as sixteen cylinder cars in which two coils are needed because a single coil could not be properly energized, due to the short length of time available for closing the breaker points. In this adaptation the revolving disk or member 219 has thereon a neon tube 221 identical with the tube 21 and there are mounted on the revolving member 219 concentric rings 50 and 51 of conductive material which rings are insulated from one another and are mounted to be rotated about the axis of the disk 219. The member 50 is connected to one end of the neon tube and the member 51 to the other end. The rings 50 and 51 are suitably supported by insulators 53. Beneath the ring 50 is a ring of conductive material 54 which ring is grounded through a support 55 and adjacent the ring 51 are a pair of segmental conductive members 56 and 57 separated from one another as shown in Fig. 7 and insulated by suitable insulating blocks 58. The segmental members 56 and 57 are arranged to substantially form a ring adjacent the ring 51.

In the apparatus a pair of spark coils 229 and 329 are provided, having secondaries 228 and 328. The secondary 228 is connected in series with the segment 57 and with a resistor 231 which is identical with the resistor 31. The secondary 328 is connected with the segmental member 56 and in series with a resistor 331 which is identical with the resistor 31. The breaker mechanism to be tested is indicated at 208 and consists of a cam 217 here shown as a four-lobe cam adapted to alternately operate breaker arms 58 and 59 which cooperate with the stationary breaker members 60 and 61 respectively which are grounded as at 62 and 63 respectively.

A battery or source of electrical energy 235 is provided and through wire 236 this battery is connected to the primaries 230 and 330 of the coils 229 and 329 respectively while wire 64 connects the primary of coil 329 with the arm 58 of the breaker and the wire 65 connects the primary 230 of coil 229 with the arm 59. As the cam 217 is revolved, the breaker arms operate alternately. Thus coil 229 energizes the segment 57 which in turn energizes the ring 51 and causes the neon tube 221 to flash. Coil 329 then energizes the segment 56 which again causes ring 51 to be energized and the tube 221 to flash, thus giving in effect one single pattern for the firing of both coils, but in reality two separate superposed patterns. By employing this apparatus it will be appreciated that a mechanic who knows how the pattern should appear, will be able to adjust the breaker arms to synchronize their operation and will be able to check the angular spacing of the points of firing of the breaker to adjust the same.

I have shown and described my invention in the embodiments preferred by me and wish to claim the same broadly as well as specifically, as pointed out in the appended claims.

Having thus described my invention, what I claim as new and desire to secure by Letters Patent is:

1. In a device of the class described for testing the breaker mechanism of a distributor of the ignition system of an internal combustion engine, the combination of means for driving said breaker, a neon tube, means for revolving said tube about an axis in synchronism with the breaker to be tested, a graduated scale adjacent the path of rotation of said neon tube, a spark coil having a primary and secondary, a resistor in series with the secondary of said spark coil and with said neon tube, said resistor being of a resistance sufficient to dampen the oscillations of the circuit without appreciably cutting down the illumination of said neon tube, a source of electricity, and means connecting said source of electricity in series with said breaker mechanism and the primary of said spark coil.

2. In a device of the class described for testing the breaker mechanism of a distributor of the ignition system of an internal combustion engine, the combination of means for driving said breaker, a neon tube, means for revolving said tube about an axis in synchronism with the breaker to be tested, a graduated scale adjacent the path of rotation of said neon tube, a spark coil having a primary and secondary, a resistor of approximately 100,000 ohms in series with the secondary of said spark coil and with said neon tube, a source of electricity, and means connecting said source of electricity in series with said breaker mechanism and the primary of said spark coil.

3. In a device of the class described for testing the breaker mechanism of a distributor of the ignition system of an internal combustion engine, the combination of means for driving said breaker, a neon tube, means for revolving said neon tube about an axis in synchronism with the breaker to be tested, a graduated scale adjacent the path of rotation of said neon tube, a spark coil having a primary and a secondary, a resistor in series with the secondary of said spark coil, electrical connections between said secondary and neon tube whereby said secondary will light said neon tube, said resistor being of a resistance sufficient to dampen the oscillations of the circuit without appreciably cutting down the illumination of said neon tube, a source of electricity, and means connecting said source of electricity in series with said breaker mechanism and the primary of said spark coil.

4. In a device of the class described for testing the breaker mechanism of a distributor of the ignition system of an internal combustion engine, the combination of means for driving said breaker, a spark coil having a primary and a secondary, means rotatable about an axis in synchronism with said breaker to be tested and carrying electrical means for giving a visible signal and adapted to give a visible electric signal on deenergization of said primary, a graduated scale adjacent the path of rotation of said electrical means, a resistor in series with a secondary of said spark coil and with said means for giving an electric signal, said resistor being of a resistance sufficient to dampen the oscillations of the circuit without appreciably cutting down the intensity of the electric signal, a source of electricity, and means connecting said source of electricity in series with said breaker mechanism and the primary of said spark coil.

5. In a device of the class described for testing a two-arm breaker mechanism of a distributor of the ignition system of an internal combustion engine in which two spark coils are employed for firing separate banks of cylinders, the combination of means for driving said breaker mechanism, a revolving member, means for revolving said revolving member in synchronism with the breaker to be tested, a neon tube supported on said member, a pair of concentric rings of conductive material mounted on said revolving member to revolve around the axis thereof, said rings being connected to opposite ends of said neon tube, and being insulated from each other, a stationary grounded ring of conductive material located adjacent one of said concentric rings on said revolving member, a pair of conductive segmental members separated from each other and insulated and arranged to substantially form a ring adjacent the other ring on said revolving member, a pair of spark coils each having a primary and a secondary, a pair of resistors one in series with the secondary of one of said spark coils and with one of said conductive segmental members and the other in series with the secondary of the other of said spark coils and the other of said conductive segmental members, said resistors being of a resistance sufficient to dampen the oscillations of their respective circuit without appreciably cutting down the illumination of said neon tube, a source of electricity, means for connecting said source of electricity in series with one of the arms of said breaker mechanism to be tested and with the primary of one of said coils, and means connecting the other arm of said breaker mechanism in series with the primary of the other coil and said source of electrical energy.

6. In a device of the class described for testing a two-arm breaker mechanism of a distributor of the ignition system of an internal combustion engine in which two spark coils are employed for firing separate banks of cylinders, the combination of means for driving said breaker mechanism, a revolving member, means for revolving said revolving member in synchronism with the breaker to be tested, a neon tube supported on said member, a pair of concentric rings of conductive material mounted on said revolving member to revolve around the axis thereof, said rings being connected to opposite ends of said neon tube and being insulated from each other, a stationary grounded ring of conductive material located adjacent one of said concentric rings on said revolving member, a pair of conductive segmental members separated from each other and insulated and arranged to substantially form a ring adjacent the other ring on said revolving member, a pair of spark coils each having a primary and a secondary, a pair of resistors of substantially 100,000 ohms one in series with the secondary of one of said spark coils and with one of said conductive segmental members and the other in series with the secondary of the other of said spark coils and the other of said conductive segmental members, said resistors being of a resistance sufficient to dampen the oscillations of their respective circuit without appreciably cutting down the illumination of said neon tube, a source of electricity, means for connecting said source of electricity in series with one of the arms of said breaker mechanism to be tested and with the primary of one of said coils, and means connecting the other arm of said breaker mechanism in series with the primary of the other coil and said source of electrical energy.

7. In a device of the class described for testing a two-arm breaker mechanism of a distributor of the ignition system of an internal combustion engine in which two spark coils are employed for firing separate banks of cylinders, the combination of means for driving said breaker mechanism, a revolving member, means for revolving said revolving member in synchronism with the breaker to be tested, a neon tube supported on said member, a pair of concentric rings of conductive material mounted on said revolving member to revolve around the axis thereof, said rings being connected to opposite ends of said neon tube and being insulated from each other, a stationary grounded ring of conductive material located adjacent one of said concentric rings on said revolving member, a pair of conductive segmental members separated from each other and insulated and arranged to substantially form a ring adjacent the other ring on said revolving member, a pair of spark coils each having a primary and a secondary, one of said segmental members being in series with the secondary of one of said spark coils and the other in series with the secondary of the other of said spark coils, a source of electricity, means for connecting said source of electricity in series with one of the arms of said breaker mechanism to be tested and with the primary of one of said coils, and means connecting the other arm of said breaker mechanism in series with the primary of the other coil and said source of electrical energy.

GERALD H. ALLEN.